United States Patent [19]

Clawson

[11] Patent Number: 4,603,681

[45] Date of Patent: Aug. 5, 1986

[54] CONDENSING FURNACE WITH CORROSION SUPPRESSION

[75] Inventor: Lawrence G. Clawson, Dover, Mass.

[73] Assignee: Raytheon Company, Lexington, Mass.

[21] Appl. No.: 785,116

[22] Filed: Oct. 7, 1985

[51] Int. Cl.$^4$ ............................................. F24H 3/02
[52] U.S. Cl. .............................. 126/110 R; 126/99 R; 126/116 R
[58] Field of Search ............ 126/99 R, 110 R, 110 B, 126/116 R; 165/134 DP

[56] References Cited

U.S. PATENT DOCUMENTS

| | | | |
|---|---|---|---|
| 4,069,809 | 1/1978 | Hartig | 126/110 R |
| 4,318,392 | 3/1982 | Schreiber et al. | 126/110 R |
| 4,449,511 | 5/1984 | Hays et al. | 126/110 R |
| 4,524,754 | 6/1985 | Schubert | 126/110 R |

Primary Examiner—Edward G. Favors
Attorney, Agent, or Firm—Richard M. Sharkansky; William R. Clark

[57] ABSTRACT

A forced hot air furnace having a continously wet condensing heat exchanger. The heat exchanger has an upwardly inclined first segment connected in series to a downwardly inclined second segment. Combustion products are first passed across a water reservoir thereby becoming sufficiently elevated in dew point to condense within the first segment resulting in all wet first segment operation. Condensate formed in the first segment will drain downward opposite the flow of combustion products, into the water reservoir. Since combustion products entering the second segment have been cooled to less than their dew point, the second segment will also operate in the all wet mode. Condensate flows down the second segment into a sump for transfer to the water reservoir.

16 Claims, 7 Drawing Figures

CONDENSING FURNACE WITH CORROSION SUPPRESSION

BACKGROUND OF THE INVENTION

The field of the invention relates to recuperative or condensing furnaces. Generally, they are furnaces which transfer both sensible heat and heat of condensation from combustion products.

Nonrecuperative furnaces only transfer sensible heat from combustion products as they are cooled. Condensation does not occur during the heat transfer cycle since combustion products are exhausted at a temperature above their dew point. Heat transfer by nonrecuperative furnaces is, therefore, commonly referred to as a dry process.

On the other hand, recuperative furnaces not only transfer heat by the dry process of nonrecuperative furnaces but also simultaneously transfer heat of condensation. A separate recuperative heat exchanger is commonly used to transfer additional heat from combustion products after they have passed through a dry process. The recuperative heat exchanger cools combustion products sufficiently to condense thereby transferring both condensate heat and sensible heat. The additional heat transfer by the recuperative heat exchanger increases overall furnace efficiency to approximately 95%. Nonrecuperative furnaces, on the other hand, are limited to 85%–88% efficiency.

Besides providing high efficiencies, the lower exhaust temperatures of recuperative furnaces enable the use of inexpensive exhaust venting such as, for example, pvc pipe rather than conventional chimneys. Further, low exhaust temperatures eliminate the draft hood associated with non-recuperative furnaces wherein heat is lost during the cooldown period at the end of each heating cycle.

Recuperative furnaces, however, are subject to corrosive attack of the recuperative heat exchanger by acidic condensate formed therein. In combusting natural gas, and to a greater extent fuel oil, a number of potentially acid forming gases are produced. Although these gases are typically noncondensable at the operating temperatures of the recuperative heat exchanger, they are absorbed by water vapor condensate thereby forming acids. For example, carbon dioxide forms carbonic acid, nitrogen dioxide forms nitric acid, hydrogen chloride forms hydrochloric acid, and hydrogen fluoride forms hydrofluoric acid. In addition, sulphur dioxide will condense within a recuperative heat exchanger thereby forming sulphurous acid. The acidity of the condensate is further increased when water condensate evaporates leaving behind concentrated acids which corrosively attack the heat exchanger.

Corrosive attack may also occur on heat exchange surface areas which are only exposed to combustion products that are above their dew point temperature. At the beginning of the heating cycle, incipient condensation may briefly form on initially cool surface areas. As these surfaces become heated during the heating cycle, the condensation evaporates and does not reoccur. Localized corrosion may therefore occur on these surfaces.

Several prior art approaches attempted to prevent corrosive attack. First, stainless steel components were used. However, it was found that chlorides are often present in our environment at levels which produce sufficient hydrochloric acid to corrode stainless steel. For example, chlorides are commonly found in laundry room areas which are often in close proximity to residential furnaces.

Second, hydrochloric acid resistant materials were proposed. A stainless steel molybedum alloy may be effective but is prohibitively expensive for residential heat exchangers. Although polymer or ceramic coatings may also be effective, they would increase thermal resistance and may also be subject to thermal shock. See U.S. Dept. of Energy, BNL51770, Condensing Heat Exchanger Systems for Residential/Commercial Furnaces and Boilers, Phase III, February 1984.

Third, U.S. Pat. No. 4,449,511 shows an external water flush system which is activated after each heating cycle to flush condensate from the coupling between the recuperator and burner. A potential corrosive problem may still exist in high chloride environments for corrosive attack on areas not flushed.

SUMMARY OF THE INVENTION

The primary object of the invention is to provide a forced hot air furnace having a condensing heat exchanger positioned for upward forced air flow wherein corrosive attack by acidic combustion product condensate is substantially lessened.

Another object of the invention is to reduce corrosion by eliminating heat transfer surface areas which dry out during the heating cycle.

Another object of the invention is to elevate the dew point of combustion products above their natural dew point by mixing water vapor with the combustion products. Condensation will thereby form at an earlier point within the heat exchanger.

Another object of the invention is to provide a forced hot air furnace having an upwardly inclined condensing heat exchanger wherein combustion products are elevated to a dew point which is greater than the temperature to which the upwardly inclined heat exchanger will cool the combustion products. Combustion product condensate will therefore form within the heat exchanger; the condensate will flow down the heat exchanger resulting in all wet heat exchange surfaces.

Another object of the invention is to provide an up flow forced air furnace wherein forced air is progressively heated by progressively hotter combustion products. In this manner, efficient thermal transfer between combustion products and forced air is effected.

Another object of the invention is to provide a condensing heat exchanger having two interconnected condensing segments, the first segment being upwardly inclined thereby providing all wet heat exchange surfaces, the second segment being positioned below the first segment for preheating air forced over the condensing heat exchanger.

Still another object of the invention is to provide a condensing heat exchanger which operates at substantially lower temperatures than conventional heat exchangers. The rate of any corrosive attack on heat exchange surfaces is thereby substantially reduced.

An additional advantage is to provide a furnace that may be modified for either upward or downward forced air flow.

These and other objects and advantages are provided by the invention which defines an apparatus for heating air, comprising a burner, means coupled directly to the burner for raising the dew point of the combustion products from the burner, a condensing heat exchanger coupled to the dew point raising means, the condensing heat exchanger comprising a first upwardly inclined segment for receiving the combustion products from the raising means and a second segment coupled in series with the first segment, and a blower for forcing air first across the second segment of the condensing heat exchanger for preheating the forced air and then across the first segment, the forced air being heated by extraction of both sensible heat and heat of condensation from the first and second segments wherein condensate forming in the first segment flows downwardly in the direction opposite the flow of the combustion products. The first segment is upwardly inclined to enable backward condensate flow. Upward inclination is herein defined as any inclination, including 90°, which enables condensate to flow backwards, opposite the flow of combustion products. The dew point raising means is coupled directly to the burner without any intervening heat exchange surfaces between the burner and the dew point raising means. Substantially all the energy from the burner is directed into the dew point raising means whereby the dew point raising means will receive combustion products in excess of 1000° F. The dew point raising means raises the combustion product dew point to a dew point which is higher than the temperature to which the first condensing heat exchanger segment cools the combustion products. Condensation, therefore, occurs within the first segment. Condensing heat exchangers are herein defined as heat exchangers which transfer both sensible heat and heat of condensation from combustion products to another fluid. The condensing heat exchanger need not be defined by two separate segments of a single heat exchanger; it may be defined by two separate, interconnected heat exchangers. Consequently, a heat exchanger segment may hereinafter be interpreted as a separate heat exchanger. The burner may be any suitable burner for oxidizing gaseous fuels. A burner suitable for oxidizing liquid fuels may also be used. Preferably, the burner may be a radiant burner for directing radiant energy into the dew point raising means. It may also be preferable that a vertical air duct be provided, the heat exchanger being positioned in the air duct, the first segment being positioned above the second segment, and wherein the blower communicates with the air duct for transferring air up the duct sequentially across the second and first segments. It may be preferable that the segments be positioned for downward forced air flow through the duct, the first segment being positioned below the second segment wherein the air blower forces air down the duct sequentially across the second segment and then the first segment.

The invention also may be practiced by a forced air furnace, comprising a burner for combusting fuel, means coupled directly to the burner for raising the dew point of combustion products from the burner, a vertical air duct, a condensing heat exchanger positioned in the air duct, the heat exchanger having an upwardly inclined first segment connected in series to a second segment, the second segment being positioned below the first segment, the first segment being connected to the dew point raising means, the first and second segments each comprising a plurality of corresponding conduits wherein the conduits of the second segment are interconnected in series with respective conduits of the first segment for transferring combustion products from the dew point raising means to the second segment, and a blower communicating with the duct for forcing air first across the second segment for preheating the forced air and then across the first segment, the forced air being heated by extraction of both sensible heat and heat of condensation from both the first and second segments wherein condensate forming in the first segment flows down the first segment conduits into the dew point raising means. It may be preferable for the dew point raising means to further comprise a means for absorbing a portion of the combustion products. For example, a portion of nitrogen dioxide and hydrogen chloride, which would otherwise combine with water vapor condensate in the condensing heat exchanger forming corrosive acids such as nitric acid and hydrochloric acid which may corrode heat exchanger surfaces, may be absorbed.

The invention further defines a forced air furnace, comprising a burner for combusting fuel, a water reservoir adjacently positioned to the burner wherein combustion products from the burner are directed against the water reservoir thereby becoming elevated in dew point, a firebox enclosing the burner and the water reservoir, an exhaust plenum, a sump positioned in the exhaust plenum, a vertical air duct, a condensing heat exchanger positioned in the air duct, the heat exchanger having an upwardly inclined first segment connected in series to a downwardly inclined second segment, the second segment being positioned below the first segment, the first segment having a plurality of upwardly inclined conduits connected between the firebox and the second segment for transferring combustion products therebetween, the first segment conduits also being connected to the water reservoir for draining condensate thereto, the second segment having a plurality of downwardly inclined conduits, each of the conduits being connected between respective conduits of the first segment and the exhaust plenum for transferring combustion products therebetween, the second segment conduits also being coupled to the sump for draining condensate thereto, means for conveying condensate from the sump to the water reservoir, and an air blower communicating with the air duct for forcing air up the duct across the heat exchanger, the air being preheated by transfer of both sensible heat and condensation heat from the second segment, the preheated air being further heated by transfer of both sensible heat and condensate heat from the first segment. It may be preferable for the furnace to have a combustion products exhaust blower coupled to the exhaust plenum for drawing combustion products from the condensing heat exchanger. It may also be preferable that means for spraying water particles into the firebox be provided. Water vapor will then be generated by evaporating the water particles in addition to, or in place of, evaporating water in the water reservoir. The condensate conveying means may preferably comprise a drain tube connected between the sump and the water reservoir. The condensing heat exchanger may preferably comprise a tube and fin heat exchanger, the conduits comprising the tubes.

The invention may further be practiced by a method for heating air forced through a furnace, comprising the steps of combusting fuel to provide combustion products, raising the dew point of the combustion products wherein substantially all the energy from combusting the fuel is retained in the dew point elevated combustion products, transferring the dew point elevated combustion products through a first condensing heat exchanger having an upward incline, transferring the dew point elevated combustion products from the first condensing heat exchanger through a second condensing heat exchanger having a downward incline, and forcing air across the second heat exchanger and then across the first heat exchanger for heating the air by extracting both sensible heat and condensation heat from both the first and second heat exchangers wherein condensate forming in the first heat exchanger flows downwardly in a direction opposite the flow of the dew point elevated combustion products and condensate forming in the second heat exchanger flows downwardly in the same direction as the dew point elevated combustion products.

BRIEF DESCRIPTION OF THE DRAWINGS

The foregoing and other objects and advantages of the invention will be more readily understood by reading the Description of the Preferred Embodiment wherein.

DESCRIPTION OF THE PREFERRED EMBODIMENT

Figure 1:
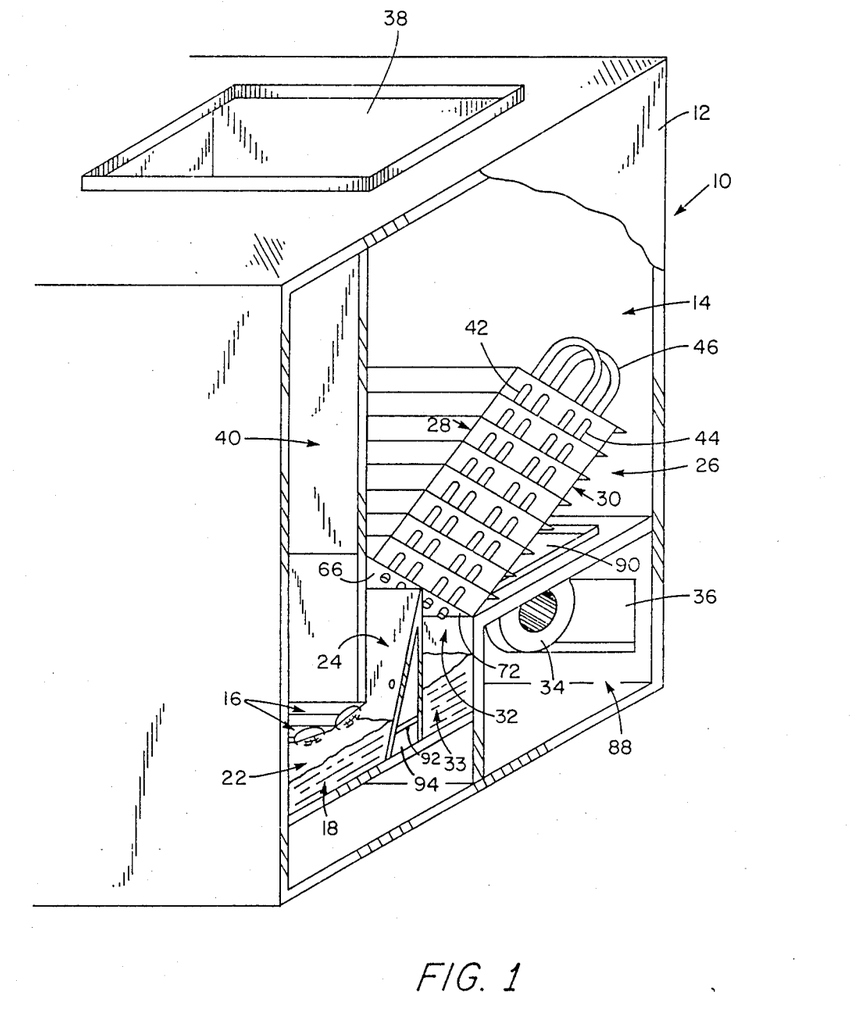
FIG. 1 is a partially broken away, right front perspective view of furnace 10 showing hot air chamber 14.
Figure 2:
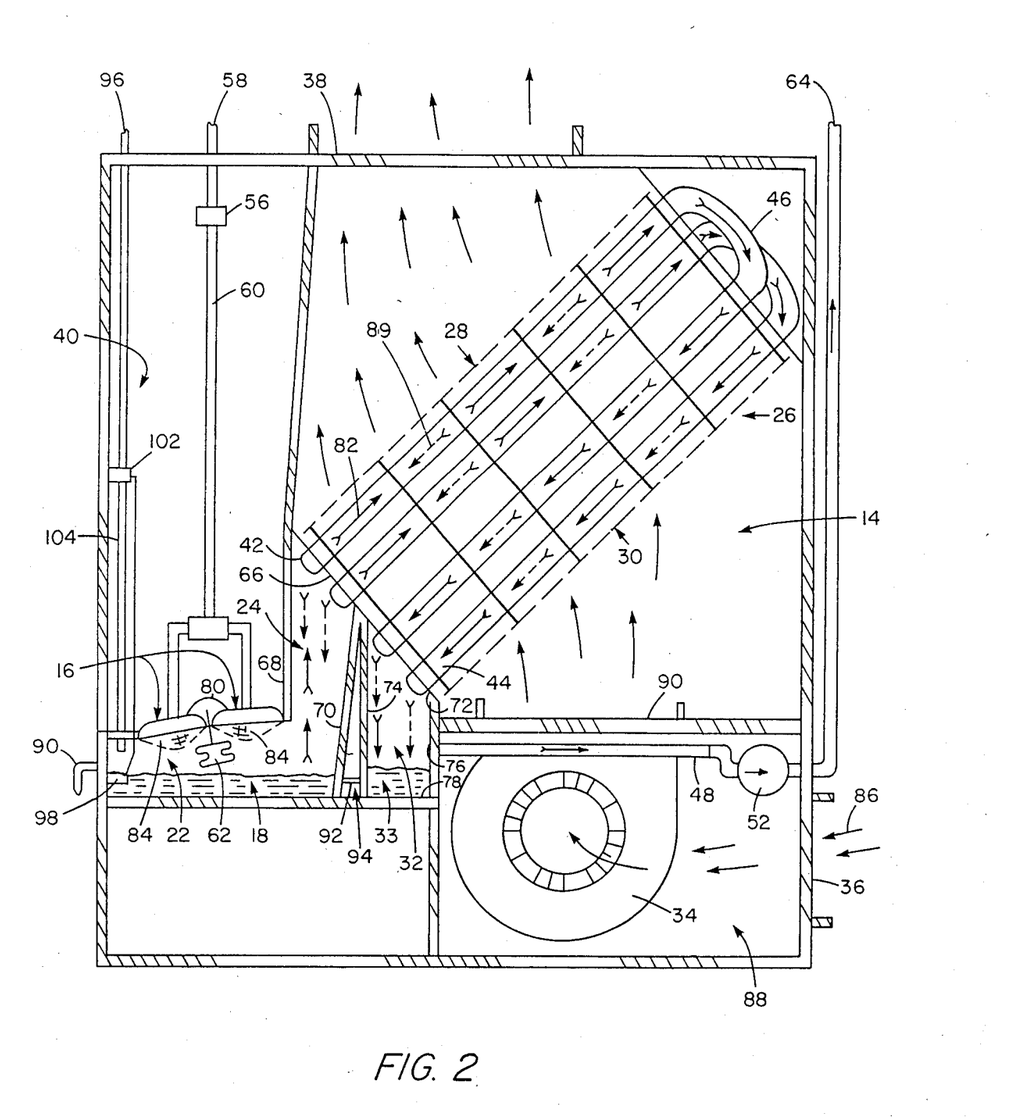
FIG. 2 is a side elevation view of FIG. 1 with side panel 12 removed.

Referring first to FIG. 1, there is illustrated a partially broken away, perspective view of recuperative furnace 10. For additional clarity, a side elevation view of furnace 10 with side panel 12 removed is shown in FIG. 2. Furnace 10 is broadly made up of hot air chamber 14, radiant burners 16, water reservoir 18, firebox 22, manifold 24, condensing heat exchanger 26, exhaust plenum 32, sump 33, blower assembly 34, return air port 36, hot air port 38 and components chamber 40.

The flow of fuel into firebox 22 is best seen in FIG. 2. Fuel valve 56, input fuel line 58, fuel pipe 60 and burners 16 are connected together in series. Upon a call for heat and in accordance with the furnace controls, as will be described later herein with particular reference to FIG. 4, exhaust products blower 52 is activated to purge residual combustion products from furnace 10. Electric current then flows through ceramic igniter tips heating them to approximately 2500° F. After a time delay from the call for heat, fuel valve 56 is opened directing a gaseous fuel into burners 16.

Figure 3:
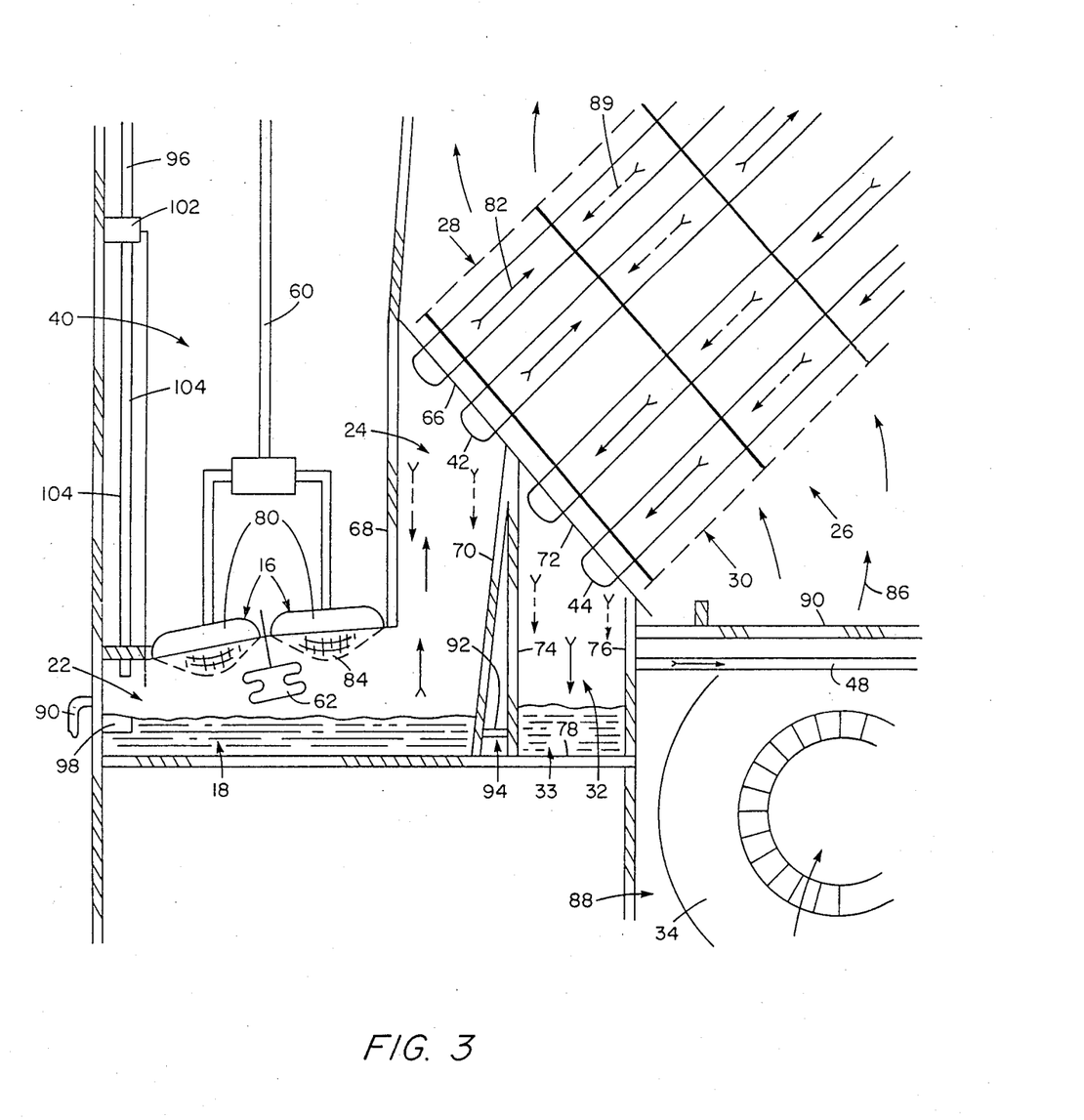
FIG. 3 is a partially broken away front elevation view of furnace 10 showing firebox 22, manifold 24 and exhaust plenum 32.

Continuing with FIGS. 1 and 2, and also referring to FIG. 3, which is a view of a portion of FIG. 2 showing firebox 22, manifold 24 and plenum 32, the flow of combustion products is now described. Firebox 22 forms a combustion chamber which partially encloses radiant burners 16 and reservoir 18. Burners 16 are here shown as conventional radiant burners, each being defined by gas plenum 80 and metal screen 84.

Condensing heat exchanger 26 is shown positioned at an incline within hot air chamber 14. Heat exchanger 26 is of fin and tube construction which is well known in the art. First and second heat exchanger segments 28 and 30, respectively, further define heat exchanger 26. Parallel tubes 42 of segment 28 are respectively connected in series to parallel tubes 44 of segment 30 by elbows 46. Tubes 42 and 44, therefore, form two parallel and opposing inclined flow paths.

First segment tubes 42 are inserted into manifold wall 66. Walls 68 and 70 extend downwards from manifold wall 66 to firebox 22 thereby defining manifold 24.

Exhaust plenum wall 72, having second segment heat exchanger tubes 44 inserted therein, forms the top of plenum 32. Side walls 74 and 76, and floor 78 further define plenum 32. Sump 33 is also defined by walls 74 and 76, and floor 78. An air space 94 between walls 70 and 74 thermally separate manifold 24 from plenum 32. Exhaust products blower 52 is connected to plenum 32 by plenum pipe 48 for drawing combustion products from plenum 32 and forcing them out exhaust pipe 64.

Accordingly, the gaseous fuel enters gas plenum 80 and is deflected substantially downward through screens 84 at increased velocity and reduced pressure. After initial ignition by igniters 62, the issuing fuel/air mixture continues to burn across the surface area of screens 84 heating it to an incandescent temperature. Radiant burners 16, therefore, operate in a conventional manner providing both hot products of combustion and infrared energy; approximately 50 percent of combustion product heat is converted into infrared energy across screens 84. In this manner, the temperature of combustion products exiting burners 16 is less than 2,000° F. whereas a typical gas burner might generate combustion products at approximately 2,800° F. Although a conventional tubular burner could be used, an advantage is obtained by using radiant burners since nitrogen oxides are not formed in significant quantities at temperatures less than 2,000° F. Thus, formation of nitric acid in the combustion product condensate is markedly reduced. Further, $NO_x$ flue emission standards of California will not be exceeded. See Rule 1111, issued by South Coast Air Quality Management District, 9150 Flair Drive, El Monte, Calif. 91731.

Burners 16 direct both combustion products and radiant energy against water reservoir 18 thereby evaporating a portion of the water contained therein. Consequently, combustion products become elevated in dew point and lowered in temperature as a portion of combustion product sensible heat and virtually all the radiant heat is converted into latent heat of vaporization. For the embodiment described herein, and assuming a 30 percent excess air/fuel mixture, combustion products are elevated from a natural dew point of approximately 128° F. to a dew point over 150° F. such as, for example, 172° F. at an approximate temperature of 1,200° F. As will be described in more detail later herein, those skilled in the art will recognize that the invention may be used to advantage with dew points and temperatures other than those illustrated.

Figure 5:
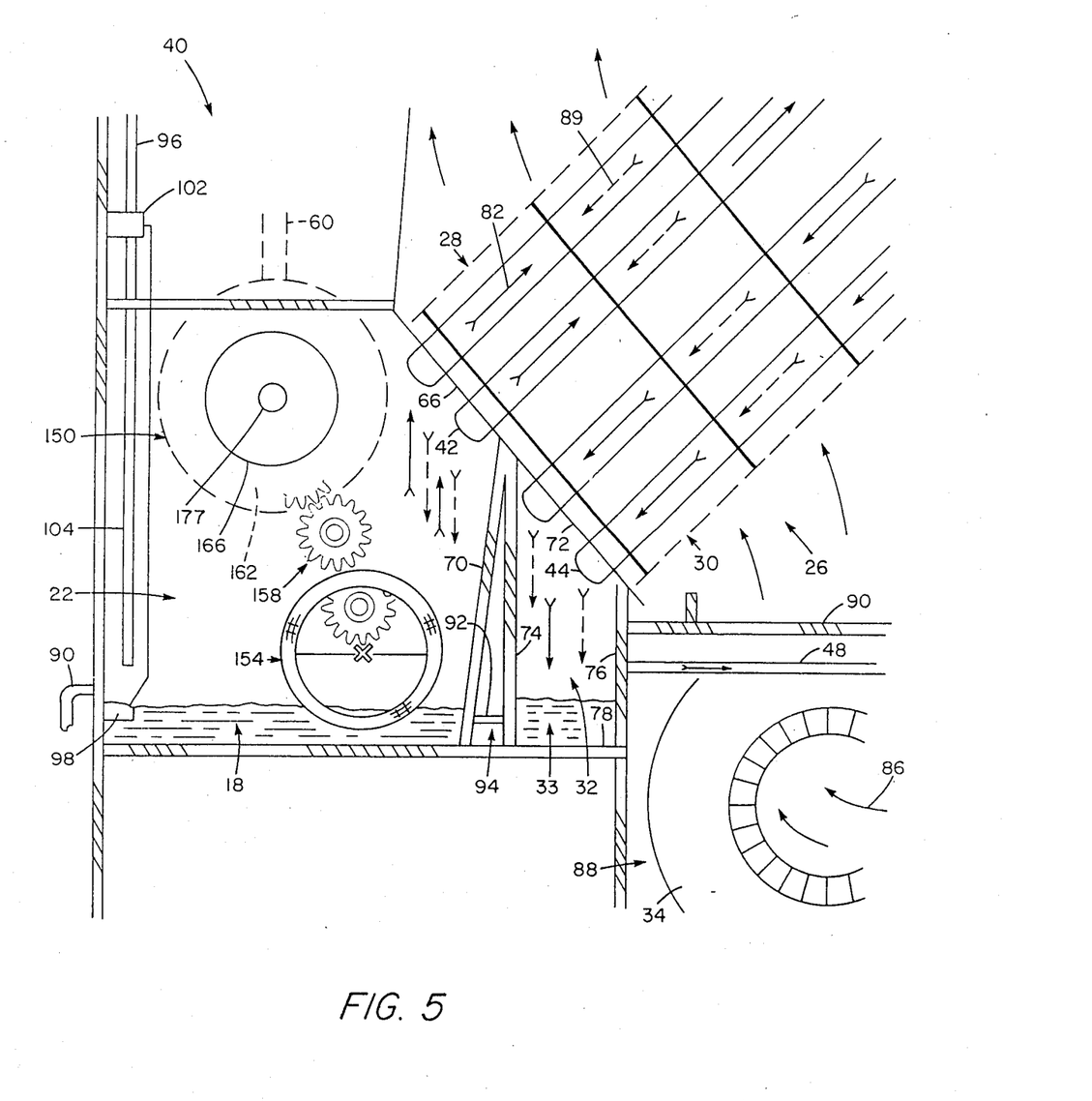
FIG. 5 is a partially broken away front elevation view of furnace 10 showing firebox 22, manifold 24 and exhaust plenum 32 being adapted for a liquid fuel burning embodiment.

Those skilled in the art will also recognize that there are numerous other configurations for combustion product dew point elevation. For example, a water atomizer may be used in conjunction with reservoir 18 to spray particles of water into the flow of combustion products. A slinger, such as the one illustrated in FIG.

5, may also be used to throw water from reservoir 18 throughout firebox 22. In this manner, the walls of firebox 22 will also be kept cooler.

Besides dew point elevation, another purpose is achieved by directing combustion products against water. A portion of potentially acid forming gases are absorbed in reservoir 18. These gases would otherwise combine with water vapor condensate in heat exchanger 26 forming corrosive acids which would attack conventional heat exchanger surfaces. Acids such as, for example, sulfurous, nitric and hydrochloric are particularly corrosive. Unfortunately, all of the potentially corrosive gases are not absorbed in reservoir 18. Other ways will be described later herein to combat corrosive condensate.

Continuing with FIGS. 2 and 3, the flow of combustion products is shown by arrows 82. Dew point elevated combustion products are drawn by exhaust products blower 52 from firebox 22, through manifold 24, through tubes 42 of first heat exchanger segment 28, through elbows 46, through tubes 44 of second heat exchanger segment 30, into plenum 32. Combustion products are cooled by forced air flowing over segments 26 and 28 as described in more detail below. The combustion products are cooled to approximately 150° F. in first segment 26 and then further cooled to approximately 100° F. in second segment 28.

The flow of forced air, as depicted by arrows 86 in FIG. 2, is now described. Blower assembly 34, shown positioned in cold air chamber 88, is connected to hot air chamber 14 through port 90. Return air port 36 and hot air port 38 respectively couple cold air chamber 88 and hot air chamber 14 to the home or other enclosure to be heated (not shown).

A time delay after a call for heat, as will be described in more detail later herein with particular reference to FIG. 4, blower assembly 34 draws return air from port 36 and forces it into hot air chamber 14. The return air is typically at an ambient temperature of 67° F. The air is preheated as it is forced across second heat exchanger segment 30 by transfer of both sensible heat and condensation heat from combustion products. As heat is transferred from the cooling combustion products, the air forced across second segment 30 will be preheated to approximately 81° F. Preheated air is then forced across first segment 28 where it will be further heated by combustion products flowing therein. The air will be heated to a temperature of approximately 135° F. by transfer of both sensible heat and condensation heat from the combustion products.

Combustion product condensate flow is now described with reference to FIG. 2 wherein arrows 89 designate condensate flow. At the beginning of the heating cycle, incipient condensation randomly forms as combustion products come in contact with the initially cool surfaces of heat exchanger 26. This first formed condensate is highly acidic and becomes more acidic as a portion of the water vapor condensate is evaporated. During the heating cycle, additional condensation will form within first segment tubes 42 as combustion products are cooled to less than their elevated dew point of 172° F. The condensate will flow downward along inclined tubes 42, in a direction which is opposite the flow of combustion products. As the condensate flows into warmer areas of segment 28, it will reevaporate. However, re-evaporation will not result in dry areas within tubes 42. When condensate is reevaporated, the combustion products become further elevated in dew point and further lowered in temperature. Consequently, condensation will reoccur at an earlier stage within segment 28. Likewise, revaporation will also occur at an earlier stage within segment 28. The reevaporation and recondensation cycle will result in a continuous downward flow of condensate along the entire length of tubes 42 into reservoir 18. That is, segment 28 will operate in the all wet mode. Dry surface areas will not occur on tubes 42 during the heating cycle. On the other hand, if segment 28 were substantially horizontal or downwardly inclined, the heat exchange surfaces which were exposed to combustion products at a temperature above dew point would be dry.

Since first segment 28 cools combustion products to 150° F., combustion products entering segment 28 must be at a dew point of at least 150° F. for condensation to occur within segment 28. To provide a safe design margin, elevation of dew point to approximately 172° F. was chosen. Those skilled in the art, however, will recognize that many other combinations of heat exchanger cooling capacity and dew point elevation could be used to advantage.

The combustion products from first segment 26 will be further cooled as they are drawn through second segment 30. Since combustion products have been cooled to less than their elevated dew point of approximately 172° F. before entering segment 30, they will remain fully saturated as they travel through tubes 44. Condensate will, therefore, fully cover tubes 44 resulting in all wet operation in second segment 30. The condensate will flow downward, in the same direction as the combustion products, into plenum sump 33.

By cooling combustion products to approximately 100° F. before they are exhausted through exhaust pipe 64, sufficient sensible heat and latent heat of vaporization is recovered to achieve approximately 95% efficiency. Even though heat is transferred to vaporize water, high efficiency is achieved because the sensible heat and radiant heat which is converted into latent heat of vaporization in firebox 22 is recovered as combustion products are cooled to their natural dew point.

Referring now to FIG. 3, the flow of condensate from sump 33 and reseroir 18 is described. Condensate drains from first segment 28 into reservoir 18 and from second segment 30 into sump 33. Reservoir 18 is connected to sump 33 through tube 94. Drain 90 connects reservoir 18 to a household or other suitable drain (not shown). Accordingly, condensate flows from sump 33 into reservoir 18. Excess condensate which is generated by recuperative heat exchanger 26 will be drained from reservoir 18 by drain tube 90. The excess condensate is generated because recuperative heat exchanger 26 cools combustion products to less than their natural dew point of 128° F.

Figure 4:
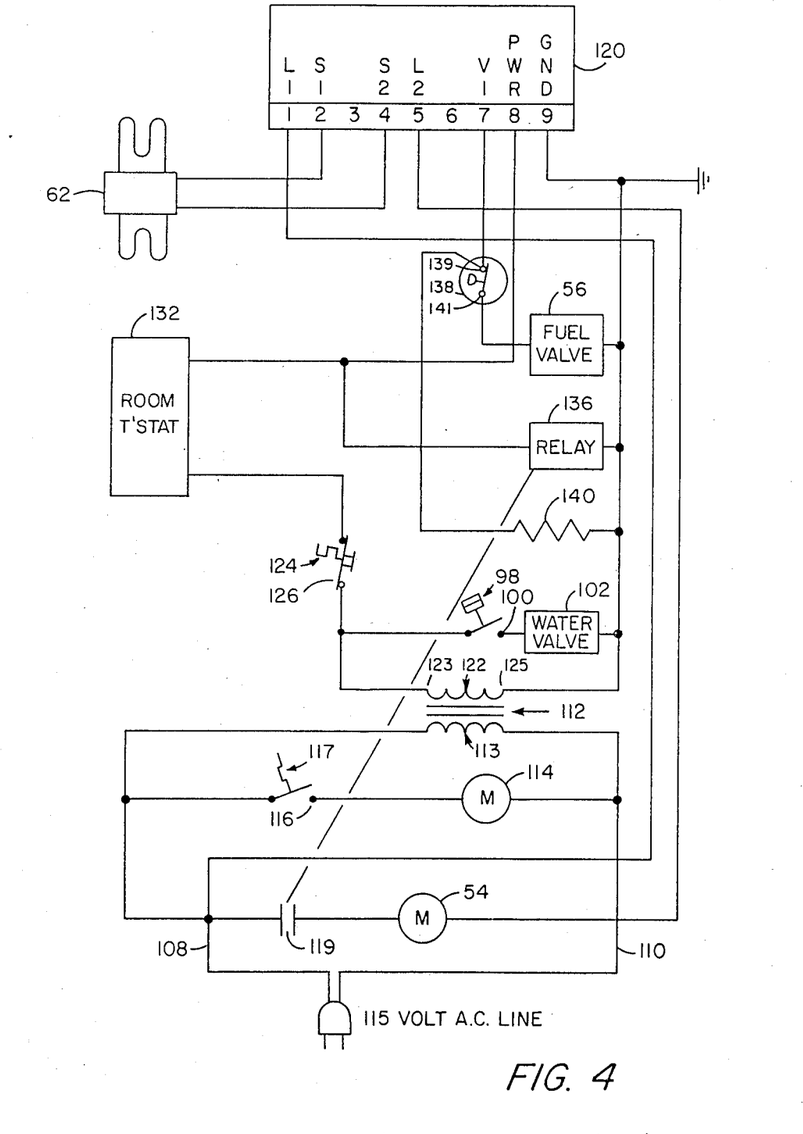
FIG. 4 is an illustrative electrical schematic for the controller of furnace 10.

In reference to FIG. 4, an electrical schematic is shown which functions as the controller for recuperative furnace 10. Terminals 108 and 110 are connected to a standard household 115-volt AC source as shown. Accordingly, the AC voltage appears across the series of exhaust motor 54 and normally open fuel/air blower contacts 119, the series of air blower motor 114 and normally open air blower control contacts 116 of temperature activated switch 117, primary winding 113 of step down transformer 112, and terminals 1 and 5 of ignition control 120. The voltage across the secondary winding 122 of step down transformer 112 is reduced to approximately 24 volts. This secondary voltage appears across the series of water valve 102 and normally open water level contacts 100 of water level switch 98. Further, side 123 of secondary winding 122 is connected through a secondary limiter 124, which consists of manually reset normally closed temperature activated contacts 126, to one terminal of room thermostat 132. The opposite terminal of thermostat 132 is connected to power input terminal 8 of ignition control 120 and one terminal of relay 136. Side 125 of secondary winding 122 is connected through blower control resistant heater 140 to terminal 139 of pressure switch 138, to the opposite terminal of relay 136, through fuel valve 56 to terminal 141 of pressure switch 138, and to grounded terminal 9 of ignition control 120. Terminal 7 of ignition control 120 is connected to terminal 139 of pressure switch 138. Further, igniters 62, which were described earlier as ceramic electronic igniter tips are connected across terminals 2 and 4 of igniter control 120. The components described herein with reference to FIG. 4 are conventional and well known in the art. For example, although the functions of ignition control 120 as described herein would be performed using a plurality of relays, it may be preferable to use a solid state device which is commercially available from Fenwal, Inc., Division of Kidde, Inc., of Ashland, Mass., as Catalog Order No. 05-212225-107. Also, igniter 62 is commercially available as Model No. 201A from Norton Company of Milford, N.H.

Upon call for heat from room thermostat 132 as mentioned earlier herein, contacts internal thereto close allowing current to flow from secondary winding 122, through secondary limiter 124 and thermostat 132, thereby energizing power terminal 8 of ignition control 120. Current also flows from room thermostat 132 activating relay 136. The activation of relay 136 closes normally open contacts 119. Closing contacts 119 completes the line voltage circuit through motor 54 that drives exhaust products blower 52.

The energizing of ignition control 120 causes igniters 62 to be energized by internally connecting pin 1 to pin 2 and pin 4 to pin 5 within ignition control 120. Igniters 62 are activated a timed delay after the call for heat to enable exhaust products blower 52 to purge residual combustion products from furnace 10. After an additional time delay, in which igniters 62 heat to their specified ignition temperature, ignition control 120 opens fuel valve 56 and energizes air blower control resistance heater 140 by internally providing power from pin 8 to pin 7. Pin 7 is connected to fuel valve 56 through pressure switch 138.

Activation of fuel valve 56 allows fuel to enter burners 16 where it is ignited by igniters 62 as previously described.

When air blower control resistance heater 140 has reached a predetermined temperature, air blower control contacts 116, which are in heat exchange relationship with heater 140, close to complete a line voltage circuit through air blower motor 114. Motor 114 turns blower assembly 34 to move return air through furnace 10 as previously described with particular reference to FIG. 2.

After room thermostat 132 is satisfied, the secondary voltage circuit through it is opened thereby removing power to ignition control 120 and relay 136. Ignition control 120 then closes fuel valve 56. When power is removed from relay 136, contacts 119 open interrupting the line voltage circuit across motor 54. Drive is then removed from exhaust blower 52.

Motor 114 however continues to drive blower assembly 34 to force heated air into the home or other enclosure to be heated until blower control contacts 116 open. Blower control contacts 116 are in heat exchange relationship with heat exchanger 26 and open when heat exchanger 26 is cooled to a predetermined temperature.

Two safety interlocks are now described. The first interlock is provided by pressure activated switch 138 which is located on manifold wall 66 (not shown). Switch 138 will open, deenergizing fuel valve 56, in the unlikely event that a blocking of combustion products causes excessive back pressure within manifold 24.

The second safety interlock is provided by water level switch 98. Inlet water pipe 96, water level valve 102, water reservoir conduit 104 and water reservoir 18 are interconnected in series (FIG. 2). Water level switch 98 is coupled to reservoir 18. Accordingly, if the water level of reservoir 18 becomes depleted due to evaporation during long standby periods, contacts 100 of switch 98 will close activating valve 102. Water reservoir 18 will then be refilled to a predetermined level.

An alternate embodiment is shown in FIG. 5 for burning fuel oil or other liquid fuels. FIG. 5 is the liquid fuel embodiment of FIG. 4. Firebox 22 is shown having a larger volume to enable complete combustion of the liquid fuel. A conventional liquid fuel burner 150, having a mixing chamber 166, flame aperture 177, and electric motor 162, is positioned within firebox 22. Motor 162 drives a fuel pump (not shown) and air blower (not shown) for generating a fuel/air mixture within chamber 166. Motor 162 is electrically connected in parallel (not shown) with fuel valve 56 (FIG. 4). Igniters 62 (not shown) are positioned within chamber 166 for igniting the fuel/air mixture in the manner previously described. Slinger 154 is partially positioned within reservoir 18 for spraying water particles throughout firebox 22. Gear driving mechanism 158 is connected between motor 162 and slinger 154 for rotating slinger 154.

After a time delay from a call for heat, as previously described, a liquid fuel/air mixture is ignited within chamber 166. Combustion products will then evaporate a portion of the water contained in reservoir 18. Without a radiant burner, however, there may be insufficient evaporation to elevate combustion product dew point to over 150° F. To assure sufficient dew point elevation, slinger 154 has been added to effectively increase the water surface area. With the slinger combustion products entering first segment 28 are at an elevated dew point of over 150° F. The remainder of furnace 10 operation is the same as previously described with reference to FIGS. 1-4.

Figure 6:
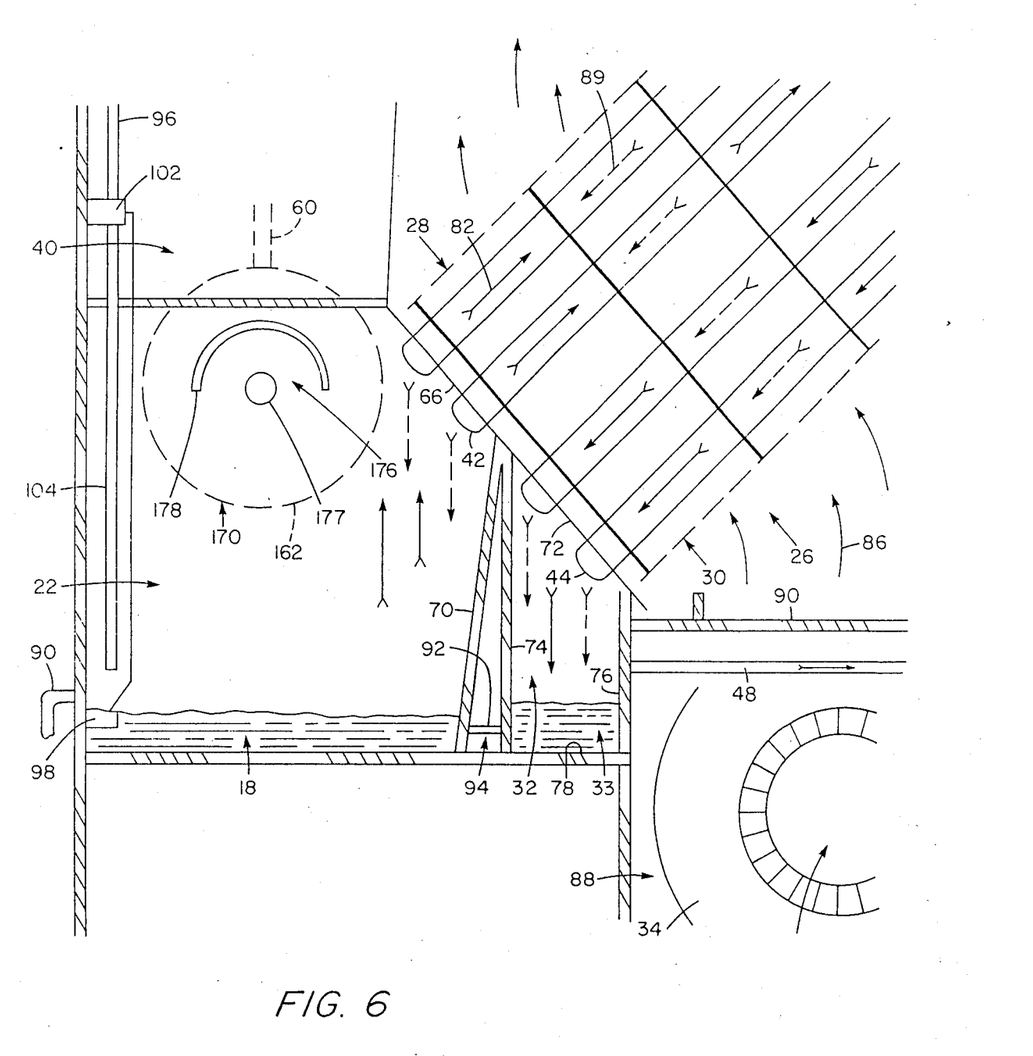
FIG. 6 is a partially broken away front elevation view of furnace 10 showing firebox 22, manifold 24 and exhaust plenum 32 being adapted for a radiant liquid fuel burning embodiment.

Another alternate embodiment is illustrated in FIG. 6 wherein a radiant oil burner 170 is shown. Mixing chamber 176 of burner 170 is defined by a partially open metallic surface 178. The fuel/air mixture is ignited, as previously described, and directed against surface 178. Radiant energy is thereby generated by heated surface 178. Both radiant heat and combustion products from radiant oil burner 170 will evaporate sufficient water in reservoir 18 to elevate combustion product dew point to over 150° F. A slinger or other apparatus to increase water surface area is, therefore, not required in this embodiment.

Figure 7:
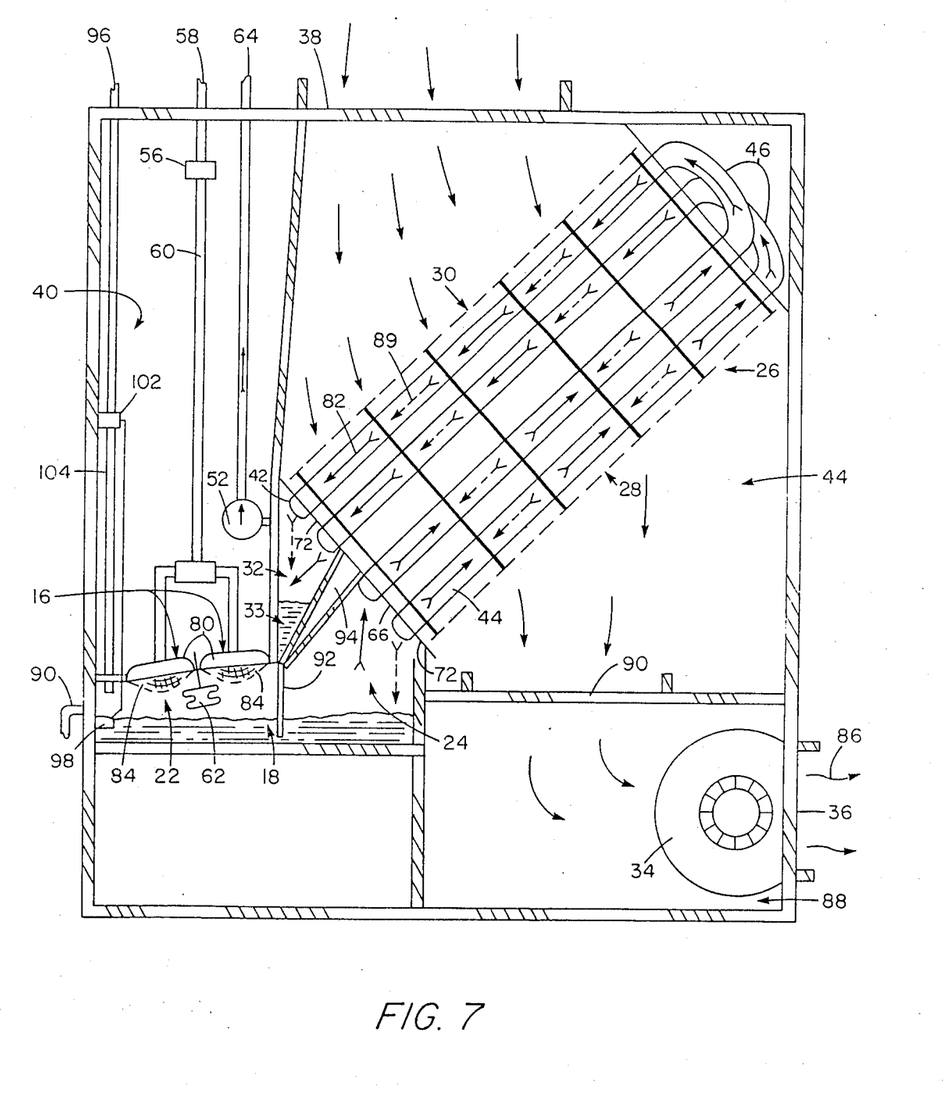
FIG. 7 is a side elevation of furnace 10 being adapted for downward forced air flow.

Another alternate furnace 10 embodiment for downward forced air flow is also shown in FIG. 7. Port 36 is connected to the hot air duct of the home or other enclosure to be heated (not shown). Port 38 is connected to the cold air return duct (not shown). Blower 34 is connected to port 36 for drawing air from hot air chamber 14 and forcing the air through port 36. Firebox 22 is coupled to first segment 28 through manifold 24. Plenum 33 is connected to second segment 30. Accordingly, air is forced downward across second segment 30 where it is preheated. The preheated air is further heated as it is drawn across hotter first segment 28. Condensate from first segment 28 drains through manifold 24 into firebox 22. Condensate from second segment 30 drains through plenum 32 into sump 33.

Except for the modifications described above, the remaining operation of this embodiment is the same as previously described with reference to FIGS. 1–4.

The all wet operation described in the above embodiments results in numerous anti-corrosion advantages. All wet operation eliminates dry out of condensate during the heating cycle. Heating cycle dry out would be highly corrosive since the water content of the condensate would evaporate first leaving behind fully concentrated acids. In prior recuperative heat exchangers, which were either horizontal or downwardly inclined, a boundary existed between dry and wet surface areas. That is, a boundary existed between dry surfaces which were exposed to combustion products above dew point temperature and wet surfaces which were exposed to combustion products below dew point temperature. Condensate near this boundary would dry out during the heating cycle resulting in a ring of localized corrosion. In addition, highly acidic incipient condensation which was formed on the dry surface areas would also dry out leaving behind highly corrosive acids.

All wet operation provides the additional advantage of low heat exchanger 26 operating temperatures. Since tubes 42 and 44 are covered with a film of condensate, their metal surfaces cannot exceed the boiling point of the condensate. Heat exchanger 26 is therefore limited to a maximum temperature of 186° F. Segment 28 will actually range in temperature from approximately 150° F. to 186° F., and segment 30 will range in temperature from approximately 150° F. to 100° F. After the heating cycle, tubes 42 and 44 will dry out at a substantially lower temperature than conventional heat exchangers. The rate of any corrosive attack is, therefore, substantially reduced.

In addition, a portion of combustion product gasses, which potentially may form corrosive acids, are progressively absorbed as the gasses pass over both reservoir 18 and the condensate covering tubes 42 and 44. Most of the gasses which would form corrosive acids such as sulfurous acid, nitric acid and hydrochloric acid are absorbed before combustion products enter second segment 30. Second segment 30 is, therefore, flushed with comparatively noncorrosive condensate. Similarly, the condensate formed near the end of first segment 28, adjacent to elbows 46, is also comparatively noncorrosive. This condensate flows backwards through the entire length of first segment tubes 42. Consequently, first segment 28 is also flushed with comparatively noncorrosive condensate.

An additional advantage is that furnace 10 may be modified for either upward or downward forced air flow while maintaining all wet heat exchanger 26 operation. Since second segment 30 is downwardly inclined, it may be positioned either above or below first segment 28. For example, positioning second segment 30 below first segment 28 is preferable for upward forced air flow wherein air is first preheated by cooler second segment 30. Further, second segment 30 may be downwardly inclined without loss of the corrosion inhibiting advantages described above. On the other hand, if second segment 30 were upwardly inclined, positioning below first segment 30 would be difficult.

Another advantage is that the most acidic condensate, including incipient condensation which has not been flushed, is confined to nonheat transfer areas such as reservoir 18, manifold 24, and plenum 32. Only these areas need be made of acid-immune materials.

A further advantage is that noxious exhaust emissions are reduced. A portion of noxious gasses are absorbed in the condensate of reservoir 18 and heat exchanger 26. When a radiant burner is utilized, emission of nitrogen oxides are also minimized by lowering the temperature of burner output without sacrifice to efficiency.

Although furnace 10 has been described with respect to specific details of certain preferred embodiments, it is not intended or required that such details limit the scope of the invention as set forth in the following claims. It will be apparent that various modifications and changes may be made by those skilled in the art without departing from the spirit of the invention as expressed in the accompanying claims. Hence, all matters shown and described are intended to be interpreted as illustrative and not in a limiting sense.

What is claimed is:

1. An apparatus for heating air, comprising:

a burner;

means coupled directly to said burner for raising the dew point of combustion products from said burner;

a condensing heat exchanger coupled to said dew point raising means, said condensing heat exchanger comprising a first upwardly inclined segment for receiving said combustion products from said raising means and a second segment coupled in series with said first segment; and a blower for forcing air first across said second segment of said condensing heat exchanger for preheating said forced air and then across said first segment, said forced air being heated by extraction of both sensible heat and heat of condensation from both said first and second segments wherein condensate forming in said first segment flows downwardly in a direction opposite the flow of said combustion products.

2. The apparatus recited in claim 1 wherein said burner comprises a radiant burner for generating both combustion products and radiant energy.

3. The apparatus recited in claim 1 further comprising a vertical air duct, said heat exchanger being positioned in said air duct, said first segment being positioned above said second segment; and wherein said air blower communicates with said air duct for transferring air up said duct sequentially across said second and first segments.

4. The apparatus recited in claim 1 further comprising a vertical air duct, said heat exchanger being positioned in said air duct, said first segment being positioned below said second segment; and wherein said air blower communicates with said air duct for transferring air down said duct sequentially across said second and first segments.

5. A forced air furnace, comprising:

a burner for combusting fuel;

means coupled directly to said burner for raising the dew point of combustion products from said burner;

a vertical air duct;

a condensing heat exchanger positioned in said air duct, said heat exchanger having an upwardly inclined first segment connected in series to a second segment, said second segment being positioned below said first segment, said first segment being connected to said dew point raising means;

said first and second segments each comprising a plurality of corresponding conduits wherein said conduits of said second segment are interconnected in series with respective conduits of said first segment for transferring combustion products from said dew point raising means to said second segment; and a blower communicating with said duct for forcing air first across said second segment for preheating said forced air and then across said first segment, said forced air being heated by extraction of both sensible heat and heat of condensation from both said first and second segments wherein condensate forming in said first segment flows down said first segment conduits into said dew point raising means.

6. The furnace recited in claim 5 wherein said burner comprises a radiant burner.

7. The furnace recited in claim 5 wherein said dew point raising means further comprises means for absorbing a portion of said combustion products.

8. A forced air furnace, comprising:

a burner for combusting fuel;

a water reservoir adjacently positioned to said burner wherein combustion products from said burner air directed against said water reservoir thereby becoming elevated in dew point;

a firebox enclosing said burner and said water reservoir;

an exhaust plenum;

a sump positioned in said exhaust plenum;

a vertical air duct;

a condensing heat exchanger positioned in said air duct, said heat exchanger having an upwardly inclined first segment connected in series to a downwardly inclined second segment, said second segment being positioned below said first segment;

said first segment having a plurality of upwardly inclined conduits connected between said firebox and said second segment for transferring combustion products therebetween, said first segment conduits also being connected to said water reservoir for draining condensate thereto;

said second segment having a plurality of downwardly inclined conduits, each of said conduits being connected between respective conduits of said first segment and said exhaust plenum for transferring combustion products therebetween, said second segment conduits also being coupled to said sump for draining condensate thereto;

means for conveying condensate from said sump to said water reservoir; and an air blower communicating with said air duct for forcing air up said duct across said heat exchanger, said air being preheated by transfer of both sensible heat and condensation heat from said second segment, said preheated air being further heated by transfer of both sensible heat and condensation heat from said first segment.

9. The furnace recited in claim 8 further comprising a blower coupled to said exhaust plenum for drawing combustion products from said condensing heat exchanger.

10. The furnace recited in claim 8 further comprising means for spraying particles of water into said firebox.

11. The furnace recited in claim 8 wherein said condensate conveying means comprises a drain tube connected between said sump and said water reservoir.

12. The furnace recited in claim 8 wherein said condensing heat exchanger comprises a tube and fin heat exchanger, said conduits comprising said tubes.

13. The furnace recited in claim 8 wherein said burner comprises a radiant burner.

14. The furnace recited in claim 8 wherein said burner comprises a gas burner.

15. The furnace recited in claim 8 wherein said burner comprises an oil burner.

16. A method for heating air forced through a furnace comprising the steps of:

combusting fuel to provide combustion products;

raising the dew point of said combustion products wherein substantially all the energy from combusting said fuel is retained in said dew point elevated combustion products;

transferring said dew point elevated combustion products through a first condensing heat exchanger having an upward incline;

transferring said dew point elevated combustion products from said first condensing heat exchanger through a second condensing heat exchanger having a downward incline; and forcing air across said second heat exchanger and then across said first heat exchanger for heating said air by extracting both sensible heat and condensation heat from both said first and second heat exchangers wherein condensate forming in said first heat exchanger flows downwardly in a direction opposite the flow of said dew point elevated combustion products and condensate forming in said second heat exchanger flows downwardly in the same direction as said dew point elevated combustion products.

* * * * *